United States Patent
Purnadi et al.

(10) Patent No.: US 9,088,883 B2
(45) Date of Patent: Jul. 21, 2015

(54) METHOD TO SUPPORT EMERGENCY CALL THROUGH MESH NETWORK

(71) Applicant: Research in Motion Limited, Waterloo (CA)

(72) Inventors: Rene Waraputra Purnadi, Irving, TX (US); Stephen McCann, Southampton (GB)

(73) Assignee: BlackBerry Limited, Waterloo, Ontario (CA)

(*) Notice: Subject to any disclaimer, the term of this patent is extended or adjusted under 35 U.S.C. 154(b) by 101 days.

(21) Appl. No.: 13/693,669

(22) Filed: Dec. 4, 2012

(65) Prior Publication Data

US 2013/0095781 A1 Apr. 18, 2013

Related U.S. Application Data

(63) Continuation of application No. 12/688,585, filed on Jan. 15, 2010, now Pat. No. 8,351,896.

(51) Int. Cl.
*H04W 4/22* (2009.01)
*H04W 76/00* (2009.01)
*H04W 84/18* (2009.01)

(52) U.S. Cl.
CPC .............. *H04W 4/22* (2013.01); *H04W 76/007* (2013.01); *H04W 84/18* (2013.01)

(58) Field of Classification Search
CPC ..... H04W 76/007; H04W 4/22; H04W 84/14; H04W 88/06; H04W 92/02
USPC ............... 455/41.1, 41.2, 403, 404.1, 404.2, 455/404.3, 410, 411, 412.1, 412.2, 414.1, 455/424, 426.1, 426.2, 521; 370/328, 245, 370/338, 406
See application file for complete search history.

(56) References Cited

U.S. PATENT DOCUMENTS

| | | | |
|---|---|---|---|
| 7,398,097 B2 | 7/2008 | Parkulo | |
| 7,649,872 B2 | 1/2010 | Naghian et al. | |
| 7,733,224 B2 | 6/2010 | Tran | |
| 7,764,633 B2 * | 7/2010 | Marque-Pucheu | 370/279 |
| 8,000,334 B2 | 8/2011 | Everson et al. | |
| 8,085,745 B2 | 12/2011 | Park et al. | |
| 8,483,151 B2 * | 7/2013 | Youn et al. | 370/329 |
| 8,879,525 B2 * | 11/2014 | Ahlback et al. | 370/338 |
| 2006/0030290 A1 * | 2/2006 | Rudolf et al. | 455/404.1 |

(Continued)

FOREIGN PATENT DOCUMENTS

| | | |
|---|---|---|
| DE | 102008004176 A1 | 7/2009 |
| WO | 2006108133 A1 | 10/2006 |
| WO | 2008027750 A2 | 3/2008 |

OTHER PUBLICATIONS

Purnadi, Rene W., et al.; U.S. Appl. No. 12/688,585, filed Jan. 15, 2010; Title: Method to Support Emergency Call Through Mesh Network.

(Continued)

*Primary Examiner* — Cong Tran
(74) *Attorney, Agent, or Firm* — Conley Rose, P.C.; J. Robert Brown, Jr.; Jonathan K. Polk (57) ABSTRACT

A method is provided for managing an emergency call in a mesh network. The method comprises a mesh station receiving an emergency indicator indicating that a call is an emergency call.

18 Claims, 6 Drawing Sheets

(56) References Cited

U.S. PATENT DOCUMENTS

| | | | |
|---|---|---|---|
| 2006/0245442 A1 | 11/2006 | Srikrishna et al. | |
| 2006/0253735 A1 | 11/2006 | Kwak et al. | |
| 2007/0021127 A1* | 1/2007 | Zheng | 455/456.1 |
| 2007/0032219 A1 | 2/2007 | Rudolf et al. | |
| 2007/0213029 A1* | 9/2007 | Edney et al. | 455/404.1 |
| 2007/0298805 A1 | 12/2007 | Basak et al. | |
| 2008/0009262 A1 | 1/2008 | Rudolf et al. | |
| 2008/0194224 A1* | 8/2008 | Thorson et al. | 455/404.1 |
| 2008/0247366 A1 | 10/2008 | Celentano et al. | |
| 2008/0309486 A1 | 12/2008 | McKenna et al. | |
| 2009/0049220 A1 | 2/2009 | Conti et al. | |
| 2009/0075625 A1* | 3/2009 | Jackson et al. | 455/404.1 |
| 2009/0143047 A1 | 6/2009 | Hays et al. | |
| 2009/0163170 A1* | 6/2009 | Norp et al. | 455/404.1 |
| 2009/0215427 A1 | 8/2009 | Hawkins | |
| 2009/0264094 A1* | 10/2009 | Smith | 455/404.2 |
| 2009/0279449 A1 | 11/2009 | Kneckt et al. | |
| 2010/0029243 A1 | 2/2010 | Ozer et al. | |
| 2011/0076991 A1 | 3/2011 | Mueck et al. | |
| 2011/0103232 A1* | 5/2011 | Sood | 370/241 |

OTHER PUBLICATIONS

Schulzrinne, H., et al.; "Public Safety Answering Point (PSAP) Callbacks"; draft-schulzrinne-ecrit-psap-callback-03.txt; ECRIT; Mar. 8, 2010; 13 pages.

McCann, Stephen; "LB-148 CID 6135 Update to Emergency Services Functionality"; IEEE 802.11-09/0609r1; May 11, 2009; 5 pages.

McCann, Stephen, et al.; "LB-142 CID 5350 Update to Emergency Alert Functionality"; IEEE 802.11-09/0311r2; May 11, 2009; 8 pages.

IEEE P802.11u/D6.0; Part 11: Wireless LAN Medium Access Control (MAC) and Physical Layer (PHY) Specifications; Amendment 7: Interworking with External Networks; Apr. 2009; 187 pages.

IEEE P802.11s/D3.0; Part 11: Wireless LAN Medium Access Control (MAC) and Physical Layer (PHY) Specifications; Amendment 10: Mesh Networking; Mar. 2009; 238 pages.

Hiertz, Guido R., et al.; "IEEE 802.11s: The WLAN Mesh Standard"; IEEE Wireless Communications; Feb. 2010; 8 pages.

Office Action dated Oct. 17, 2011; U.S. Appl. No. 12/688,585, filed Jan. 15, 2010; 12 pages.

Notice of Allowance dated Feb. 13, 2012; U.S. Appl. No. 12/688,585, filed Jan. 15, 2010; 10 pages.

Final Office Action dated Apr. 27, 2012; U.S. Appl. No. 12/688,585, filed Jan. 15, 2010; 9 pages.

Notice of Allowance dated Oct. 3, 2012; U.S. Appl. No. 12/688,585, filed Jan. 15, 2010; 6 pages.

PCT International Search Report; Application No. PCT/US2010/021222; Sep. 7, 2010; 4 pages.

PCT Written Opinion of the International Searching Authority; Application No. PCT/US2010/021222; Sep. 7, 2010; 7 pages.

* cited by examiner

METHOD TO SUPPORT EMERGENCY CALL THROUGH MESH NETWORK

BACKGROUND

Figure 1:
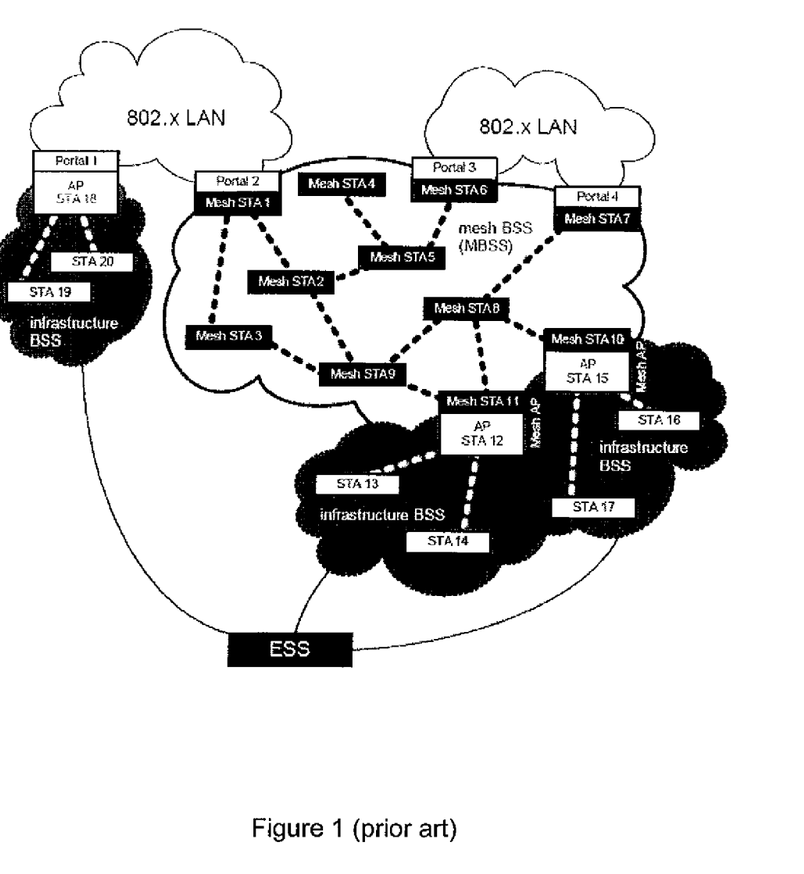
FIG. 1 illustrates a mesh network architecture, according to the prior art.

A traditional wireless telecommunications network typically includes a base station, access point, node B, evolved node B, or other central component that acts as a controller and coordinator for control plane and user plane traffic to and from the clients in the network. A mesh network, on the other hand, can be defined as a group of wireless telecommunications devices capable of communicating directly with one another instead of or in addition to communicating with the central component. A mesh network typically includes a plurality of wireless devices such as laptop computers, handheld computers, mobile phones or mobile handsets, personal digital assistants, and similar devices. When used in a mesh network, such devices are referred to as mesh stations (MSTAs). In some cases, one or more MSTAs in a mesh network may also act as a portal or an access point to another network. In other cases, the MSTAs in a mesh network form a stand-alone network that is not connected to a portal or an access point. In these cases, one of the MSTAs typically acts as a root MSTA. Details regarding mesh networks can be found in the WLAN standard amendment document IEEE 802.11s Draft 3.0, which is incorporated herein by reference as if included in its entirety. FIG. 1 illustrates a typical mesh network architecture according to IEEE 802.11s Draft 3.0. An MSTA can collocate with an access point or with a portal to other local area networks. These MSTAs form a mesh basic service set (MBSS).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present disclosure provide methods and mechanisms for managing emergency calls in a mesh network. More specifically, an Emergency Indicator (EI) is used to indicate that an emergency call is being initiated or is ongoing in a mesh network. As described in more detail below, the EI can be used during path establishment for the emergency call, during the authentication process for the emergency call, and/or in the data frame of the emergency call for prioritization purposes. As used herein, the term "emergency call" might refer to a voice call, such as a 911 call (in North America) or a 112 call (in most of Europe), or a multimedia emergency call, such as a NG911 (Next Generation 911) which includes text based and video messages, that might be handled by a Public Safety Answering Point (PSAP).

Within the existing IEEE 802.11 WLAN specifications, three emergency service indicators are specified for managing emergency calls. The ESC (Emergency Service Capability) is a parameter to indicate emergency service support. It is set to "1" only if the system currently supports emergency calls. It is intended to be a system deployment scoped parameter. The UESA (Unauthenticated Emergency Service Accessible) is a parameter that is set to "1" if unauthenticated emergency service access is available. That is, in some locations, an authentication procedure must be followed before an emergency call is allowed to pass through a wireless network. If this authentication procedure is not required in a particular network, the UESA can be set to "1" for that network to indicate that emergency calls can pass through that network without authentication.

In addition, when an emergency alert message arrives at the IEEE 802.11 infrastructure, an access point advertises the availability of the emergency alert message by including an Emergency Alert element for that message in its Beacon and Probe response frames. The access point includes one instance of an Emergency Alert element in its Beacon and Probe response frames for each active emergency alert system message.

These emergency call handling procedures for traditional wireless networks may not be applicable to mesh networks because of the different characteristics of mesh networks. That is, a mesh network can be ad hoc and topologically dynamic in that MSTAs can move apart from each other, can sleep in a power save mode, can be turned off by the user, and so on. Therefore, it may not be possible for a consistent path to be maintained for an emergency call in a current mesh network, and some special behavior might be needed for a mesh network to support emergency calls from an MSTA.

In an embodiment, when an emergency call occurs in a mesh network, each MSTA in the mesh network is made aware of when the emergency call is initiated and when the emergency call is occurring (that is, when the MSTA is receiving and/or forwarding an emergency call payload). This ensures that each MSTA will properly handle the emergency call. For example, an MSTA might load balance, prioritize, and/or drop other calls to accommodate the emergency call when resources are inadequate, might proactively search for a new link earlier when the link metric drops below a certain threshold, might not go to a sleep or power save mode when it is in the path of the emergency call, might report its location when it is available, might accept an emergency call request from an unauthenticated neighboring MSTA, and/or might warn the user not to turn the MSTA off when the MSTA is involved in the emergency call.

In an embodiment, a new flag for mesh operation is specified and might be referred to as the Emergency Indication (EI) flag. The EI might be a single bit or multiple bits that indicate that a call is an emergency call. In countries or other jurisdictions where a single number, such as 911, can be used to reach multiple emergency services, such as police, ambulance, or fire services, a single bit may suffice for the EI. In countries or other jurisdictions where different numbers are used to reach different emergency services, a plurality of bits may be used for the EI. For example, if a user presses an emergency call button indicating "police", the EI might be set to "00", and the portal might forward the emergency call to a local police station. If a user presses an emergency call button indicating a hospital, the EI might be set to "01", and the portal might forward the emergency call to a local hospital. Hereinafter, the EI will be referred to as a single bit.

When the EI is set to a first value such as "1", the EI indicates that an emergency call is initiating (in the emergency call peering and path establishment action frames) or is ongoing (in the emergency call data frames). Some or all of the special mesh emergency behavior mentioned above might then be implemented. When the EI is set to a second value such as "0", no emergency call is requested, no data frame belongs to an emergency call, and no special mesh emergency behavior is performed. Setting the EI equal to the first value might be referred to herein as including the EI, and setting the EI equal to the second value might be referred to herein as not including the EI.

In an embodiment, when an MSTA initiates an emergency call, the MSTA sets the EI to "1". The MSTA then includes the EI in a frame it sends to a neighbor MSTA that is capable of supporting an emergency call. When an MSTA is acting as an intermediary to an emergency call, the MSTA receives the EI from a neighbor MSTA and then includes the EI in a frame it sends to a neighbor MSTA that is capable of supporting an emergency call. An MSTA that initiates an emergency call or that sends emergency call-related frames to another MSTA might be referred to herein as a source MSTA.

In an embodiment, the EI is included in the action frame during the mesh peering procedure, in the action frame during the path establishment procedure, and in the data frame that carries the emergency call payload. During the mesh peering procedure, an EI set to "1" allows an MSTA to engage in mesh peering with a neighbor MSTA without undergoing an authentication procedure, if an unauthenticated emergency call is allowed. During the path establishment procedure, an EI set to "1" informs the neighbor MSTA in the emergency call path to find the best path, to prioritize resources for the emergency call, to proactively find a better path before the link conditions deteriorate below a certain threshold, and/or to change some of the MSTA's behavior (for example, to disable the power save feature). An EI set to "1" in the data frame allows the neighboring MSTA in the emergency call path to receive data from an unauthenticated peer MSTA and forward the data to an unauthenticated peer MSTA and to direct the data only to a PSAP in the portal to another network. An EI set to "1" also indicates that the frame is entitled to have the highest quality of service (QoS) possible.

In addition, as described in detail below, the behavior of the emergency indicators already specified in 802.11, such as the ESC and the UESA, might be modified for an emergency call in a mesh network. Details will now be provided for the use of the EI in the peering procedure, the path establishment procedure, and the data forwarding procedure, and for the modified behavior of the existing emergency indicators.

Before a request can be made for a path for a call through a mesh network, links may need to be established between pairs of MSTAs in the mesh network. This link establishment procedure is known as peering. As part of the peering procedure, a pair of MSTAs might exchange identity and security information in order to authenticate one another. In the current IEEE 802.11s draft, when an MSTA discovers a peer with a matched Mesh-ID, the MSTA starts a link establishment and authentication procedure with the peer MSTA. If the authentication is successful, peering is established and the MSTA becomes a member of the mesh network to which the peer MSTA belongs.

In an embodiment, emergency peering is a special case of peering, purely for emergency calls. In establishing a link for an emergency call, a source MSTA sets the EI to "1", and (as described below) the access category that the MSTA is authorized to use is set to the maximum. If the UESA is set to "1" (no authentication for emergency call), the authentication procedure can be skipped during emergency peering. That is, the peering does not require a matching Mesh-ID or any authentication procedure, and security information is ignored. If the UESA is set to "0" (authentication is required in emergency call), authentication is included during emergency peering. The authenticated emergency peering uses the same procedures as in the current IEEE 802.11s draft. Regardless of the UESA, during mesh peering, an EI set to "1" activates a default emergency call profile stored in an MSTA that is capable of supporting an emergency call.

In an embodiment, during the peering procedure, the EI allows an MSTA to engage in mesh peering with a peer MSTA regardless of whether or not the peer MSTA is in a state of accepting a new peer. The peer MSTA may need to drop one of its established peers.

In an embodiment, the EI is also used in the path establishment procedure for an emergency call through a mesh network. At least three different path establishment procedures are currently used in mesh networks: the on demand mode, the proactive tree building mode, and the portal announcement mode. The use of the EI in each of these procedures will now be described.

In the on demand mode of path establishment, the source MSTA broadcasts a PREQ (Path Request) to its peer MSTAs, and each peer MSTA further broadcasts PREQ to their peer MSTAs until the destination MSTA is reached. Each intermediate MSTA in the path and the destination MSTA may receive several PREQ copies and each copy traces a unique path with a corresponding cumulative air link metric value (accumulated from each traversed link in the path, based on the air link value).

Each intermediate MSTA also stores each sender of the PREQ as a candidate for a forwarding node in the reverse path (from destination to source). The destination MSTA selects the PREQ with the best cumulative air link metric and then sends a unicast PREP (Path Reply) to the source MSTA by tracing back the unique path that has been followed by the PREQ with the corresponding cumulative air link metric. Each intermediate MSTA that receives the PREP stores the sender of the PREP as a node in the forward path (from source to destination) and the receiver of the PREP (among the candidates for forwarding in the reverse path) as a node in the reverse path, eliminating the other candidates from its memory. An intermediate MSTA that never receives the PREP will also eliminate these candidates forwarding in the reverse path from its memory when a timer expires. Once the path is established, the source MSTA sends a maintenance PREQ, and the destination responds with a PREP. Hence, the source MSTA is periodically looking for and updating the path with the best cumulative air link metric value.

In an embodiment of the on demand mode of path establishment, for emergency call support, the EI is added in a PREQ and is set to "1". Each intermediate MSTA stores the EI for each path. If an intermediate MSTA is unable to support the EI for some reason, the intermediate MSTA sends a PERR (Path Error) to the source MSTA that transmitted the PREQ so that the source MSTA can find another MSTA to which to forward the PREQ. The PERR can include a reason code to indicate that an emergency call is not supported.

The EI can also serve as an indication of how each MSTA in the selected emergency call path should behave. For example, an EI set to "1" can indicate that an intermediate MSTA is not allowed to go into an 802.11s power save mode and/or can indicate that this MSTA may set itself to a more aggressive path discovery mode in order to find a better link before the current link deteriorates below a certain threshold called the "EI_threshold". This is an air link metric threshold for supporting emergency calls and preventing a particular link from failing (even before the maintenance PREQ from the source MSTA arrives). Therefore, the path discovery procedure is not only triggered when the path to the destination is not known or for periodic path maintenance, but also to maintain a link if that link metric falls below the EI_threshold. Once the new path discovery is completed, the new path immediately becomes the active path.

In an embodiment, during the on demand path establishment procedure, the EI allows the MSTA to engage in path establishment with a peer MSTA regardless of whether the peer MSTA has enough resources to support the emergency call. The peer MSTA may need to drop an established call, even if that call has the highest QoS (e.g., AC_VO, as described below).

In the proactive tree building mode of path establishment, the root MSTA, the mesh portal, or the mesh access point broadcasts a proactive PREQ or RANN (Root Announcement) to its peer MSTAs that they further propagate to their peer MSTAs until all MSTAs in the mesh network are reached or the TTL (Time To Live) has reached its maximum, resulting in each MSTA knowing the path to the root. Similarly, each MSTA may receive multiple proactive PREQ or RANN, where each proactive PREQ or RANN traverses a unique path with a corresponding cumulative air link metric. If an MSTA needs to establish a path with the root (e.g., has a session to start, data to send, etc.), the MSTA may respond with a proactive PREP (if the MSTA received a proactive PREQ) or a PREQ (if the MSTA received a RANN). The proactive PREP or the PREQ follows the path of the proactive PREQ or the RANN, respectively, with the best cumulative air link metric. Since this is not a beacon or probe response, the proactive PREQ and RANN will be propagated only to each MSTA that has a peering with the sender.

In an embodiment of the proactive tree building mode of path establishment, if the mesh portal, mesh access point or root MSTA supports emergency calls, it propagates a 'Proactive PREQ' message with the EI set to "1". The Proactive PREQ message is accompanied by a Proactive PREP bit set to "0" to allow the receiving MSTA to postpone sending the Proactive PREP until a bidirectional path to the root MSTA is needed. Each MSTA along the path knows the capability of the path to the root MSTA (e.g., to support emergency call, VoIP, etc.). If an intermediate MSTA is unable to support the same capability as in the incoming proactive PREQ for any reason, the intermediate MSTA sets the EI to "0" (becomes the weakest link) and the propagated proactive PREQ has the EI set to "0" from then on. That is, the Proactive PREQ is propagated from the originator (mesh access point, mesh portal or root MSTA) over multiple paths. Any MSTA that cannot support an emergency call resets the EI from "1" to "0", and the path becomes unable to support emergency calls. The other paths that do not include those particular MSTAs can still support emergency calls (EI remains "1") and the MSTA uses this path to initiate an emergency call. If there are multiple paths to the root MSTA with emergency call capabilities, the MSTA selects the one with the best cumulative air link metric and/or the least number of hops. If an intermediate MSTA is unable to support the same capability as in an incoming proactive PREQ or RANN, the intermediate MSTA sends a PERR to the latest sender of the proactive PREP or PREQ so that the sender can find another path.

When an MSTA needs to establish a bi-directional path with the root for emergency calls, a proactive PREP (as a response to proactive PREQ) with the EI set to "1" follows the path that is capable of supporting the emergency call that the MSTA requests. In the RANN element, the ESC and UESA are added to the RANN element, and when an MSTA needs to establish a bi-directional path with the root MSTA that sent the RANN, the MSTA sends a PREQ with EI set to "1" to the originator of the RANN and receives a PREP with the EI also set to "1" from the originator of the RANN.

In the portal announcement mode of path establishment, a portal mesh can initiate or propagate a Portal Announcement (PANN). PANN is particularly used by a portal connected to another network, while RANN is used by a root MSTA that is not necessarily connected to another network. The portal mesh broadcasts a PANN, in a beacon or Mesh Interworking action frame using a group address, to neighboring MSTAs that will further propagate the PANN to their neighboring MSTAs until all MSTAs in the mesh network are reached or the TTL (Time to Live) has reached its maximum, resulting in each MSTA knowing the path to the portal. Similarly, each MSTA may receive multiple PANNs, where each PANN traverses a unique path, but a PANN does not have cumulative air link metric information. That is, a PANN allows the mesh portal to let all MSTAs know how to reach it. When an active path is needed, an MSTA initiates a PREQ to the portal. This PREQ carries the cumulative air link metric. The portal responds with a PREP that also carries the cumulative air link metric. The acceptance rules in the current IEEE 802.11s Draft 3.0 only indicate that an MSTA should not accept and process a PANN if the PANN sequence number is lower than the previously received PANN. Therefore, each MSTA will keep multiple PANNs as long as the PANN sequence number is not lower than the previously received one.

In this embodiment, the portal sets ESC to "1" and adds the appropriate UESA to the PANN element if the portal supports emergency calls.

In any of the three modes of path establishment, if the PSAP loses the MSTA that originated the emergency call, the PSAP might call the MSTA back. To provide a callback number for emergency call regulatory requirements, the MSTA might pass a suitable address or identifier in the emergency media set up signaling message.

In an embodiment, the EI is also used for prioritization of emergency calls. Different call types have different Class of Service (CoS) access priorities in a mesh network. The prioritization in the current mesh network has a mandatory EDCA (Enhanced Distributed Control Access) access priority and an optional MCCA (Mesh Coordination Control Access) access priority to provide CoS for different types of access category. The access categories, in order of decreasing priority, are VoIP (AC_VO), video streaming (AC_VI), Best Effort (AC_BE), and background (AC_BK).

In an embodiment, to support an emergency call, when the EI is set to "1", an MSTA uses the highest available level of access priority. When resources are insufficient to accommodate the required CoS for supporting an emergency call, the MSTA may drop other ongoing calls, including another AC_VO ongoing call.

After the emergency peering and path establishment procedures are complete and an emergency call is connected between a source MSTA and a peer MSTA, the peer MSTA verifies each data frame it receives for emergency call use. If a data frame does not have EI set to "1", that data frame is not forwarded. The mesh portal or root MSTA that supports emergency calls forwards to the PSAP only those data frames with EI set to "1".

For the mesh data frame, the one octet Mesh Flags in the Mesh Control field have four reserved bits (bits 4-7). In an embodiment, two of these bits, e.g., bits 5-6, can be used to indicate the four access categories (AC_VO, AC_VI, AC_BE and AC_BK) and bit 7, for example, might indicate the EI. If an access category is not specified and only emergency calling is supported, only bit 7 is used to indicate an emergency call data frame. The emergency peer forwards only those data frames with the EI set to "1". The mesh portal or root MSTA forwards to the PSAP only those data frames with the EI set to "1".

In an embodiment, the two existing IEEE 802.11 emergency call indicators, ESC and UESA, are still utilized, but their behaviors may be modified. A source MSTA may modify the ESC before propagating it to a peer MSTA if the source MSTA cannot support the emergency call for some reason. For example, the source MSTA may change the ESC from "1" to "0" to indicate that emergency calling will not be supported on a path through that MSTA. A source MSTA, however, does not change its support for emergency calling when an emergency call is ongoing through that MSTA. In a mesh network, both authenticated and unauthenticated emergency call access is possible. Therefore, the UESA bit is propagated from MSTA to MSTA.

An MSTA that supports emergency calls advertises the ESC and UESA bits originating from a mesh access point, mesh portal or root MSTA with similar support. In an embodiment, an MSTA that cannot support an emergency call changes these bits from "1" to "0" in its beacon or probe response. During emergency call mesh peering and path establishment, an MSTA that advertises that ESC equals "0" is not used in an emergency call path. Hence within a mesh network, the ESC and UESA bits indicate a path for emergency calls through to a PSAP.

If the ESC and UESA are added as a parameter in a PANN or RANN element, any MSTA in the path that cannot support emergency calls resets the ESC bit to "0" before propagating the PANN or RANN. If multiple paths support emergency calls, an MSTA selects the path with the least number of hops. In a new PANN with a higher PANN sequence number, the MSTA in the path may change its support for emergency calls, based on the latest conditions, before propagating the PANN to its neighboring MSTAs. Each MSTA updates the ESC bit accordingly.

Figure 2:
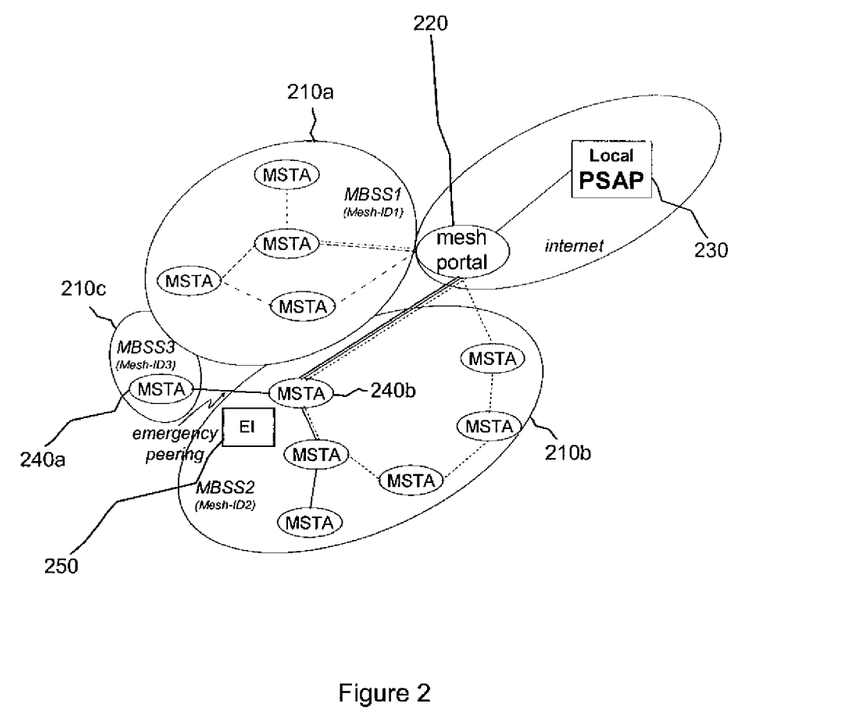
FIG. 2 illustrates a mesh network architecture, according to an embodiment of the disclosure.

A system in which these embodiments might be implemented is illustrated in FIG. 2. In an MBSS 210 that is capable of supporting emergency calls, a mesh portal 220 or mesh access point connects to a PSAP 230. Alternatively, a root MSTA (for a stand alone MBSS) directly connects to the PSAP 230. In this example, MSTA 240a might initiate an emergency call, and a path for the emergency call might be established with MSTA 240b. Upon initiating the emergency call, MSTA 240a sets the EI 250 to "1" in the mesh peering and path establishment element and passes the EI to MSTA 240b. MSTA 240b then knows that the call is an emergency call. If MSTA 240b is capable of handling the emergency call, MSTA 240b sets the EI to "1" whenever MSTA 240b attempts to connect to another MSTA for the purpose of establishing a path for the emergency call. A path for the emergency call is then established through MSTA 240b, and any MSTAs to which MSTA 240b connects then know that the call is an emergency call. If MSTA 240b is not capable of handling the emergency call, MSTA 240a does not establish an emergency call path through MSTA 240b. MSTA 240b might send a PERR to MSTA 240a with EI set to "0" to inform MSTA 240a that a path for the emergency call is not to be established through MSTA 240b.

Figure 3:
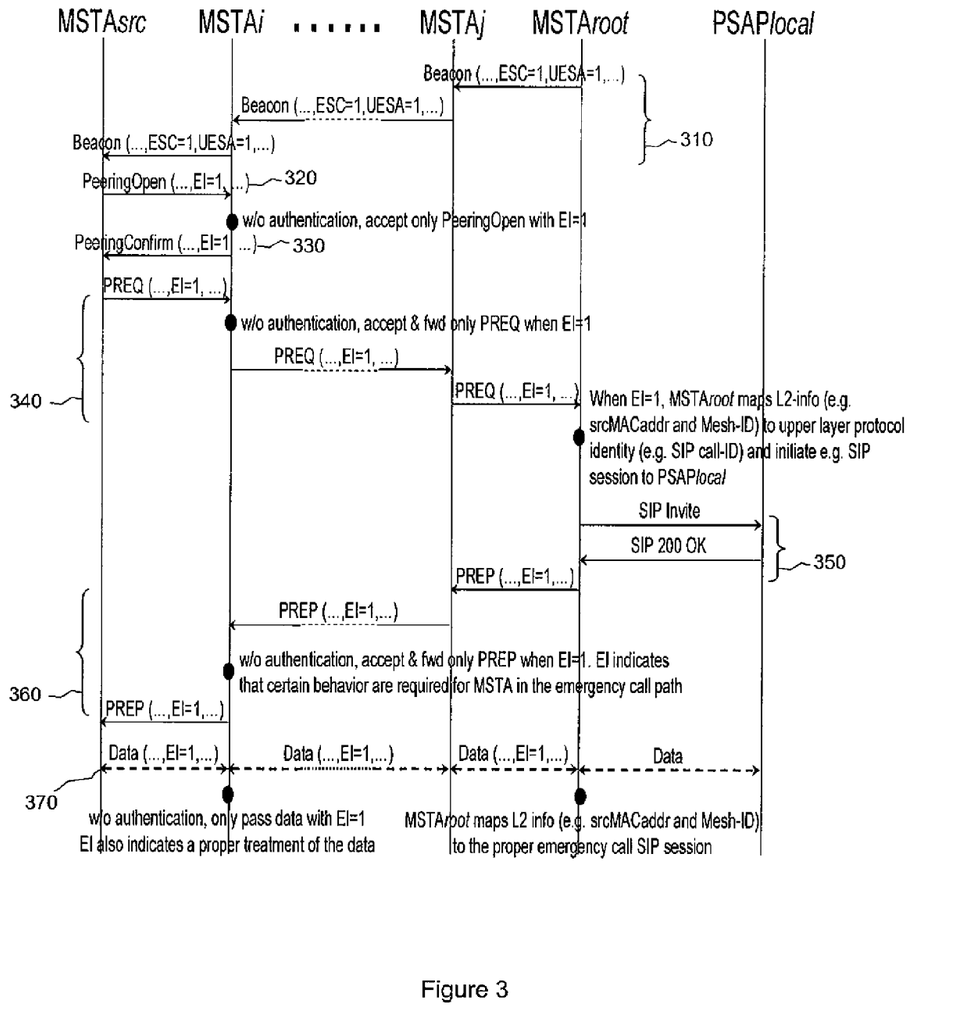
FIG. 3 illustrates an embodiment of a call flow diagram for an emergency call in a mesh network for an unauthenticated MSTA, according to an embodiment of the disclosure.

FIG. 3 illustrates an embodiment of a call flow diagram for an emergency call in a mesh network for an unauthenticated MSTA (UESA is set to "1"). At events 310, beacon messages are sent from a root MSTA, through one or more intermediary MSTAs, to a source MSTA. ESC and UESA are both set to "1", indicating that emergency calls are supported for unauthenticated MSTAs. At event 320, the source MSTA sends a PeeringOpen message to a first MSTA and includes an EI set to "1". If the source MSTA is not authenticated, the first MSTA accepts the PeeringOpen message only when EI is set to "1". At event 330, the first MSTA returns a PeeringConfirm message to the source MSTA. At events 340, PREQ messages that include the EI set to "1" are sent from the source MSTA, through one or more intermediary MSTAs, to the root MSTA. At events 350, the root MSTA and a PSAP exchange Session Initiation Protocol (SIP) messages. At events 360, PREP messages that include the EI set to "1" are sent from the root MSTA, through one or more intermediary MSTAs, to the source MSTA. At event 370, data frames that include the EI set to "1" are exchanged between the source MSTA and the PSAP through the root MSTA and one or more intermediary MSTAs.

Figure 4:
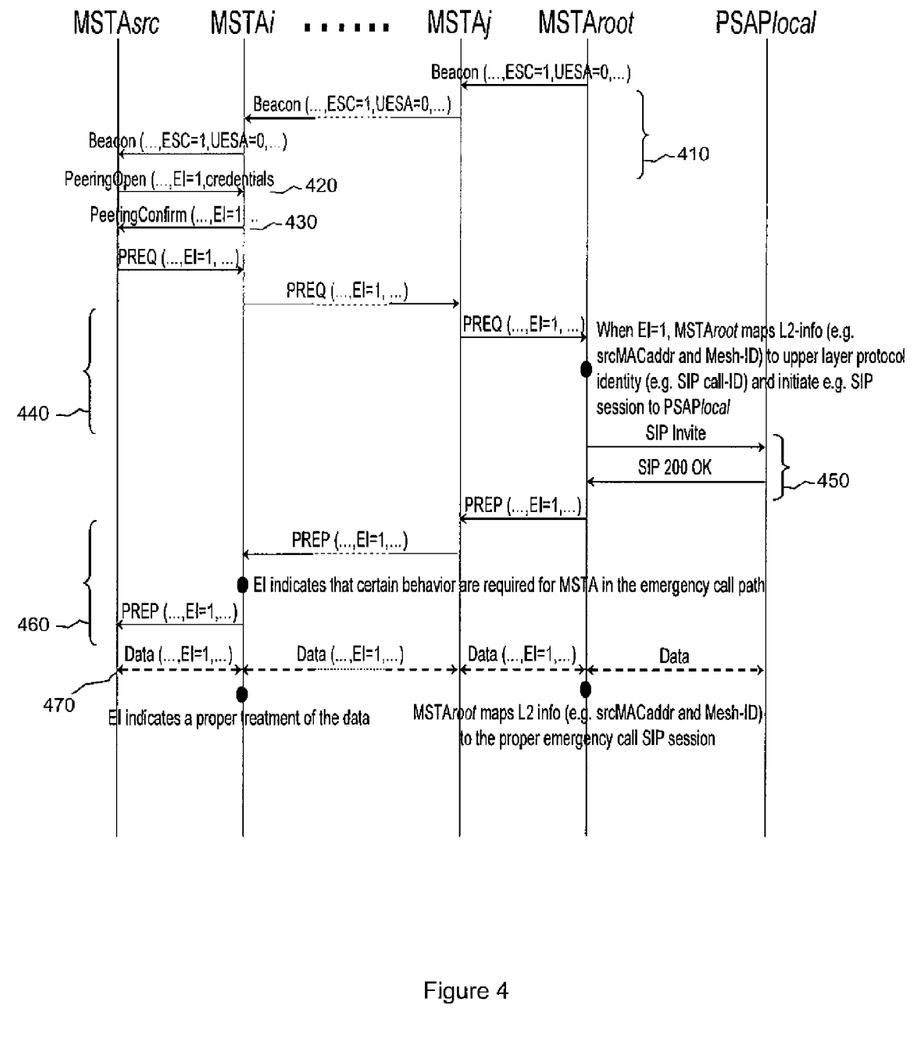
FIG. 4 illustrates an embodiment of a call flow diagram for an emergency call in a mesh network for an authenticated MSTA, according to an embodiment of the disclosure.

FIG. 4 illustrates an embodiment of a call flow diagram for an emergency call in a mesh network for an authenticated MSTA (UESA is set to "0"). At events 410, beacon messages are sent from a root MSTA, through one or more intermediary MSTAs, to a source MSTA. ESC is set to "1", and UESA is set to "0", indicating that emergency calls are supported only for authenticated MSTAs. At event 420, the source MSTA sends a PeeringOpen message to a first MSTA and includes an EI set to "1" and its authentication credentials. At event 430, the first MSTA returns a PeeringConfirm message to the source MSTA. At events 440, PREQ messages that include the EI set to "1" are sent from the source MSTA, through one or more intermediary MSTAs, to the root MSTA. At events 450, the root MSTA and a PSAP exchange SIP messages. At events 460, PREP messages that include the EI set to "1" are sent from the root MSTA, through one or more intermediary MSTAs, to the source MSTA. At event 470, data frames that include the EI set to "1" are exchanged between the source MSTA and the PSAP through the root MSTA and one or more intermediary MSTAs.

Figure 5:
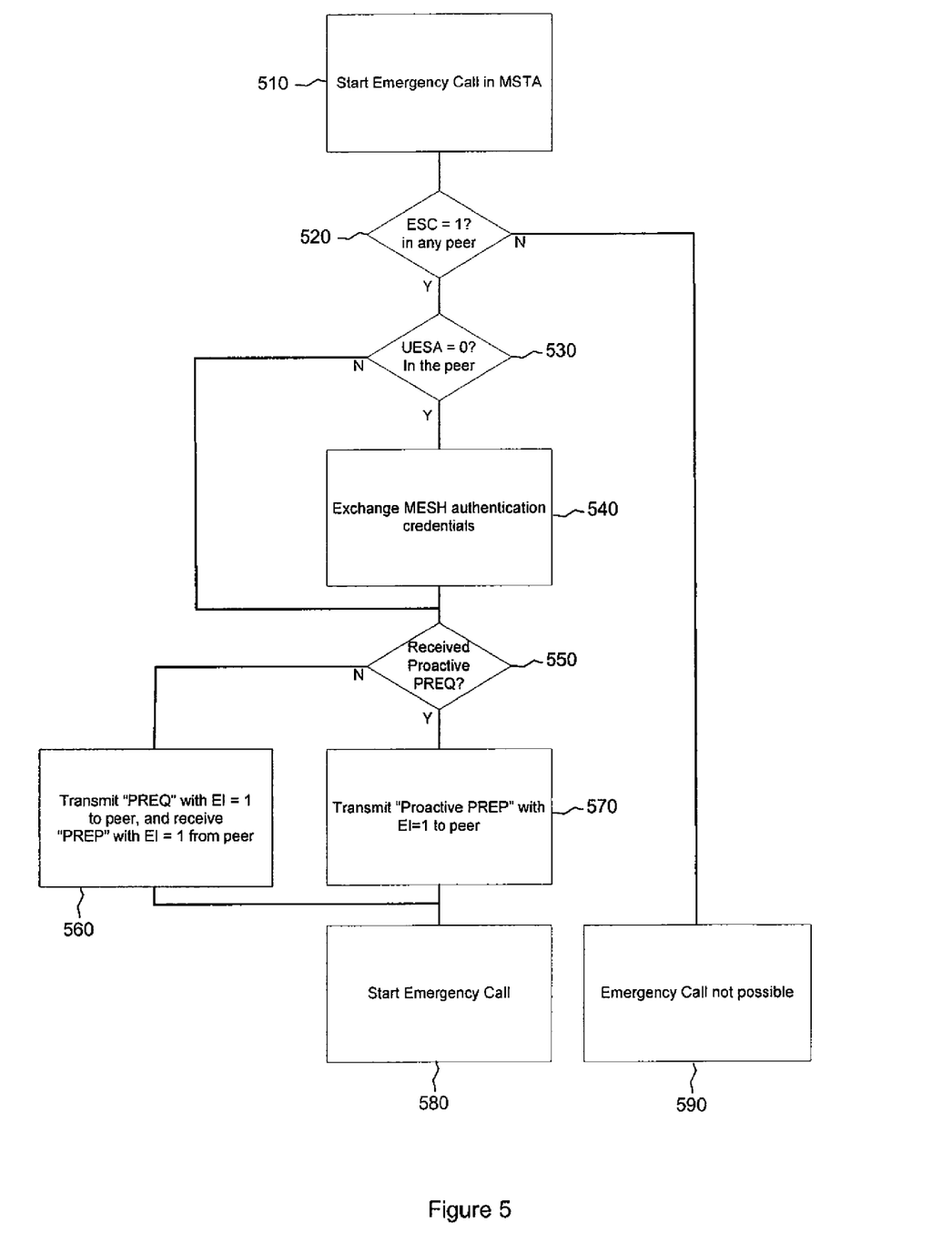
FIG. 5 illustrates an embodiment of a flow chart for path discovery for an emergency call in a mesh network, according to an embodiment of the disclosure.

FIG. 5 illustrates an embodiment of a flow chart for path discovery for an emergency call in a mesh network. At block 510, an MSTA initiates an emergency call. At block 520, the MSTA determines if ESC is equal to "1" in any peer. If ESC does not equal "1" in any peer, an emergency call is not possible, as shown at block 590. If is set to "1" in at least one peer, the flow proceeds to block 530, where it is determined whether UESA is equal to "0" in a peer that had ESC set to "1". If UESA does equal "0" in the peer, then mesh authentication credentials are exchanged at block 540. If UESA does not equal "0" in the peer, or after mesh authentication credentials are exchanged at block 540, the flow proceeds to block 550, where it is determined whether a Proactive PREQ was received. If a Proactive PREQ was received, a Proactive PREP is transmitted to the peer at block 570 with EI set to "1". If a Proactive PREQ was not received, a PREQ with EI set to "1" is transmitted to the peer and a PREP with EI set to "1" is received from the peer at block 560. After either the PREP is received or the Proactive PREP is transmitted at either block 560 or block 570, respectively, the emergency call is initiated at block 580.

Figure 6:
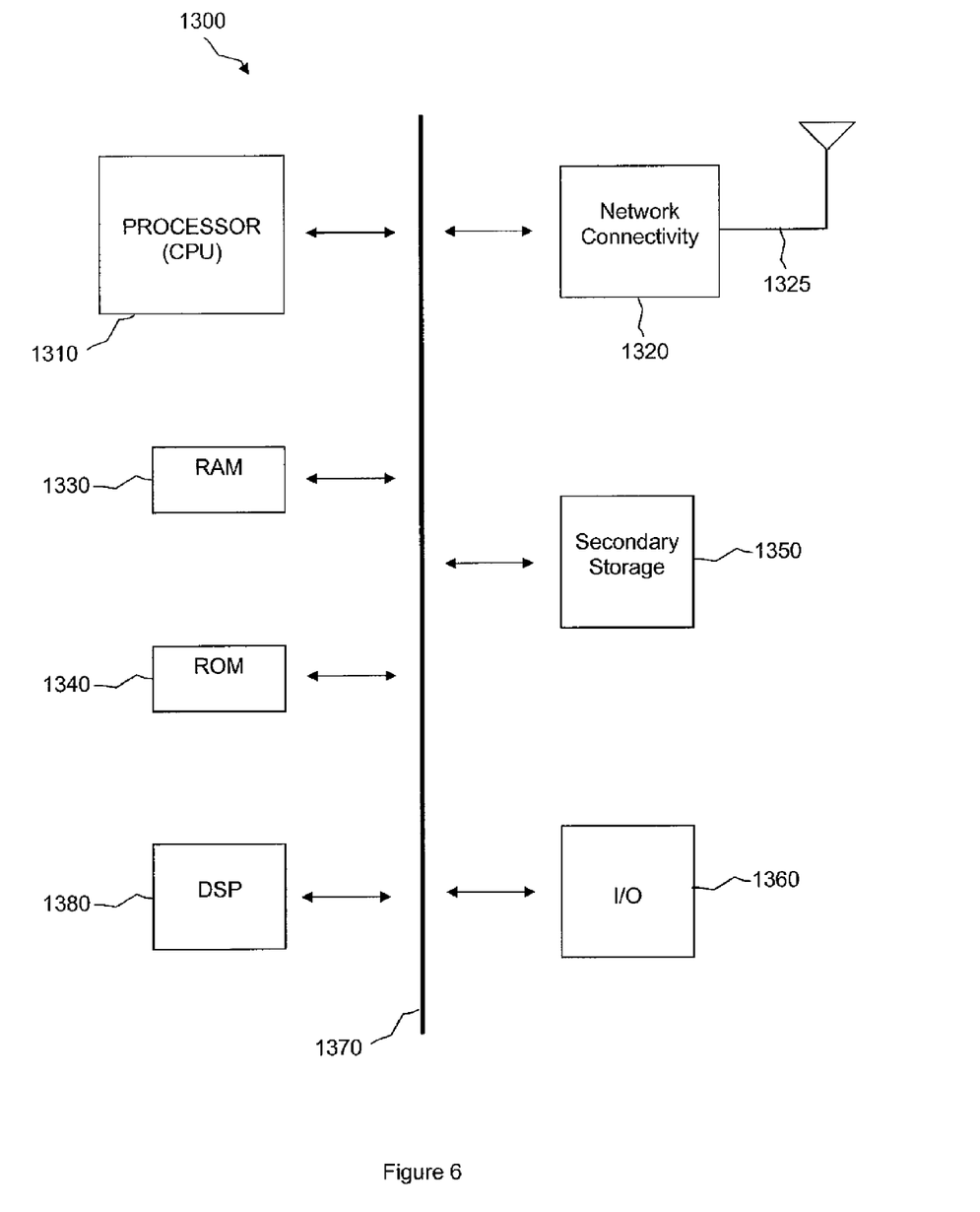
FIG. 6 illustrates a processor and related components suitable for implementing the several embodiments of the present disclosure.

The components described above might include a processing component that is capable of executing instructions related to the actions described above. FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for managing an emergency call in a mesh network. The method comprises an MSTA receiving an EI indicating that a call is an emergency call.

In another embodiment, an MSTA in a mesh network is provided. The MSTA includes a processor configured such that the MSTA receives an EI indicating that a call is an emergency call.

In another embodiment, an MSTA in a mesh network is provided. The MSTA includes a processor configured such that the MSTA includes in a frame transmitted by the MSTA an emergency indicator indicating that a call being initiated by the MSTA is an emergency call.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
receiving, at a mesh station (MSTA), an emergency indicator (EI) indicative of a request for emergency service in a mesh network,
wherein, when a bit associated with the MSTA is set to "0", the MSTA does not direct data to a public safety answering point (PSAP) and when the bit associated with MSTA is set to "1", the MSTA directs data to the PSAP,
wherein the MSTA establishes a priority link in the mesh network when the bit associated with the MSTA is set to "1".

2. The method of claim 1 further comprising searching, by the MSTA, for a new link before a link metric drops below a threshold.

3. The method of claim 1 further comprising disabling, by the MSTA, a power saving mode.

4. The method of claim 1 further comprising accepting, by the MSTA, an emergency service request from an unauthenticated MSTA.

5. The method of claim 1, wherein the EI is included within an action frame during at least one of a peering procedure or a path establishment procedure to indicate that emergency services are allowed.

6. The method of claim 1 further comprising engaging in mesh peering with a peer MSTA without undergoing an authentication procedure.

7. The method of claim 1 further comprising directing frames to the PSAP.

8. The method of claim 1, wherein the emergency service has the highest level of access priority.

9. The method of claim 1, wherein, when the MSTA is unable to support emergency services, the MSTA sets an Emergency Service Capability indicator to "0" to indicate that the MSTA is unable to support emergency services.

10. A mesh station (MSTA) comprising:
a processor configured to:
receive an emergency indicator (EI) indicative of a request for emergency service in a mesh network,
wherein, when a bit associated with the MSTA is set to "0", the MSTA does not direct data to a public safety answering point (PSAP) and when the bit associated with MSTA is set to "1", the MSTA directs data to the PSAP,
wherein the MSTA establishes a priority link in the mesh network when the bit associated with the MSTA is set to "1".

11. The MSTA of claim 10 wherein the processor is further configured to search for a new link before a link metric drops below a threshold.

12. The MSTA of claim 10 wherein the processor is further configured to disable , by the MSTA, a power saving mode.

13. The MSTA of claim 10 wherein the processor is further configured to accept an emergency service request from an unauthenticated MSTA.

14. The MSTA of claim 10 wherein the EI is included within an action frame during at least one of a peering procedure or a path establishment procedure to indicate that emergency services are allowed.

15. The MSTA of claim 10 wherein the processor is further configured to engage the MSTA in mesh peering with a peer MSTA without undergoing an authentication procedure.

16. The MSTA of claim 10 wherein the processor is further configured to direct frames to the PSAP.

17. The MSTA of claim 10, wherein the emergency service has the highest level of access priority.

18. The MSTA of claim 10 wherein, when the MSTA is unable to support emergency services, the processor is further configured to set an Emergency Service Capability indicator to "0" to indicate that the MSTA is unable to support emergency services.

* * * * *